United States Patent [19]
Lilja et al.

[11] Patent Number: 5,645,389
[45] Date of Patent: Jul. 8, 1997

[54] SHIPPING FRAME FROM FAN SECTION OF AIRCRAFT ENGINE

[75] Inventors: Gerald D. Lilja, Parker, Colo.; Frank Fowler, Gilford, Conn.; Robert F. Hatch, Aurora, Colo.

[73] Assignee: Stanley Aviation Corporation, Aurora, Colo.

[21] Appl. No.: 565,384

[22] Filed: Nov. 30, 1995

[51] Int. Cl.$^6$ ................................................ B60P 1/04
[52] U.S. Cl. .................. 414/343; 414/350; 414/401; 414/469; 414/778; 414/786; 206/319
[58] Field of Search .................... 414/343, 346, 414/350, 469, 396, 401, 584, 679, 778, 781, 786; 206/319

[56] References Cited

U.S. PATENT DOCUMENTS

| | | | |
|---|---|---|---|
| 2,594,586 | 4/1952 | Ries | 206/319 |
| 2,613,807 | 10/1952 | Higbee | 206/319 |
| 2,670,166 | 2/1954 | Applegate | 206/319 X |
| 2,674,370 | 4/1954 | Iredell, III | 206/319 |
| 2,674,371 | 4/1954 | Blackinton | 206/319 |
| 2,928,535 | 3/1960 | Simmons et al. | 206/319 |
| 2,982,395 | 5/1961 | Rados | 206/319 |
| 3,194,525 | 7/1965 | Webb | 206/319 X |
| 3,211,299 | 10/1965 | Metzrath | 206/319 X |
| 3,795,323 | 3/1974 | Ouska | 414/778 |
| 4,117,927 | 10/1978 | Gothsche | 206/319 |
| 4,699,337 | 10/1987 | Lewis | 414/343 X |
| 5,186,597 | 2/1993 | Blusterbaum et al. | 414/469 |
| 5,320,475 | 6/1994 | Pinder | 414/343 |
| 5,413,449 | 5/1995 | Schoenherr et al. | 414/343 |
| 5,433,572 | 7/1995 | Swain et al. | 414/778 X |

FOREIGN PATENT DOCUMENTS

| | | | |
|---|---|---|---|
| 270055 | 7/1989 | Germany | 414/778 |
| 4114739 | 11/1992 | Germany | 414/778 |
| 153245 | 6/1989 | Japan | 414/778 |
| 2174042 | 10/1986 | United Kingdom | 414/679 |

OTHER PUBLICATIONS

No. 1: Product information advertisement by applicant Re: Core Engine Module.
No. 2: Product information advertisement by applicant Re: various types of ground support equipment to secure and transport components of a jet aircraft.
No. 3: Product information advertisement by applicant Re: a cradle device for securing a component of a jet aircraft engine.
No. 4: Product information advertisement by applicant Re: a cradle device for securing components of a jet air aircraft engine.
No. 5: Product information advertisement by applicant Re: Engine Stand.
No. 6: Product information advertisement by applicant Re: Hydraulic Engine Stand.
No. 7: Relevant portions of a product information catalog by Advance Ground Systems Engineering Corporation of Anaheim, California (23 Oct. 1990).

*Primary Examiner*—David A. Bucci
*Attorney, Agent, or Firm*—Fields & Johnson, P.C.

[57] ABSTRACT

A fan shipping frame includes a frame assembly for supporting a loaded fan section of a jet aircraft engine. A plurality of caster assemblies attached to the shipping frame provide locomotive capability and adjustable height positioning so that a loaded fan section may be transferred onto the appropriate transport aircraft or vehicle. Rail members mounted on the frame assembly are alignable with rail members of a fan dolly so that the fan section may be directly transferred from the fan dolly onto the shipping frame. A template bracket integral with the shipping frame enables the fan section to be mounted thereon. A platform assembly rotatably mounted to the shipping frame may be deployed to enable the fan section to be tilted from a vertical transport position to a horizontal transport position wherein, the shipping frame may be transported in either position. A storage container mounted on the shipping frame stores the removed fan blades of the fan section in either position.

41 Claims, 9 Drawing Sheets

SHIPPING FRAME FROM FAN SECTION OF AIRCRAFT ENGINE

TECHNICAL FIELD

This invention relates to an apparatus providing a means of transport for an object and, more particularly, to a shipping frame for the fan section of a jet aircraft engine.

BACKGROUND ART

In the commercial aircraft industry, a need has developed for the capability of transporting jet aircraft engine components in order that these components may be repaired or retrofitted. Jet aircraft engines are perhaps the most critical assembly of an aircraft wherein the engines must be inspected and maintained to the highest level of repair. Periodically, it is necessary to remove the engine from the wing or fuselage of an aircraft so that the jet aircraft engine and its components can undergo the necessary inspection and repairs. There are three major component sections of the jet aircraft engine; namely, the inlet cowl, the fan section, sometimes known as the fan case, and the core section. When the fan section is removed from the core section, this is known as "engine splitting." The fan section may be removed from the core section either when the entire jet aircraft engine has been removed from the aircraft, or some circumstances dictate that only the fan section be removed while the core section remains attached to the aircraft.

Some prior art devices exist for securing and transporting jet aircraft engine components that have been removed from an aircraft. Typically, these prior art devices include a number of differing configurations which releasably secure the components and provide a means for moving the components so that it may be transported to the desired location for the needed inspection or repairs.

While the prior art devices may be adequate for their intended purposes; one significant shortfall, particularly for the transport of fan sections of a jet aircraft engine, is that the prior art does not provide a shipping frame which enables the fan section to be transported in either a vertical or horizontal position. Furthermore, the prior art does not provide for a reliable means of transport for the fan section that may be directly coupled to an intermediate transport apparatus known as a fan dolly which transfers the fan section onto the shipping frame.

DISCLOSURE OF THE INVENTION

In the most broad disclosure of the invention, a shipping frame for securing and transporting the fan section of a jet aircraft engine is disclosed. By use of the fan shipping frame, a fan section may be transported in either an upright position, or it may be tilted ninety degrees (90°) so that the fan section is positioned on its end in a horizontal position. Shipping the fan section in the upright mode is acceptable when shipping the fan section by means of, for example, a Boeing 747 jet aircraft or on a truck. However, if the fan section is to be transported, for example, by a C130 cargo aircraft, the fan section must be positioned on its A-flange or end because the height of the rear cargo hatch of the C130 aircraft is too small to accept a vertically positioned fan section of, for example, a Boeing 777 aircraft. Furthermore, the shipping frame may be coupled to a fan dolly enabling direct loading of the fan section onto the shipping frame.

Structurally, the shipping frame includes a frame assembly for supporting a loaded fan section and includes a plurality of caster assemblies which provide locomotive capability to the fan shipping frame. A plurality of jack mechanisms attached to the frame assembly enable the shipping frame to be positioned at a desirable height so the fan section may be loaded onto the appropriate aircraft or vehicle. As will be further explained below, rail members mounted on the frame assembly are alignable with rail members on a fan dolly so that the fan section may be directly transferred onto the shipping frame. Once the fan section is transferred to the shipping frame, the fan section is secured thereon by means of a template bracket which aligns with the attaching ring of the fan section. If it is necessary to tilt the fan section ninety degrees (90°) to the horizontal for transport, a novel platform assembly is deployed enabling the fan section to be tilted without the aid of external equipment. Mounted on the fan shipping frame is a storage container which may receive and store the fan blades of the fan section in either the upright or the tilted mode. The storage container includes a plurality of storage cells which have unique curved shapes which match the shape of the fan blades.

Additional advantages of this invention will become apparent from the description that follows, taken in conjunction with the accompanying drawings.

BEST MODE FOR CARRYING OUT THE INVENTION

Figure 1:
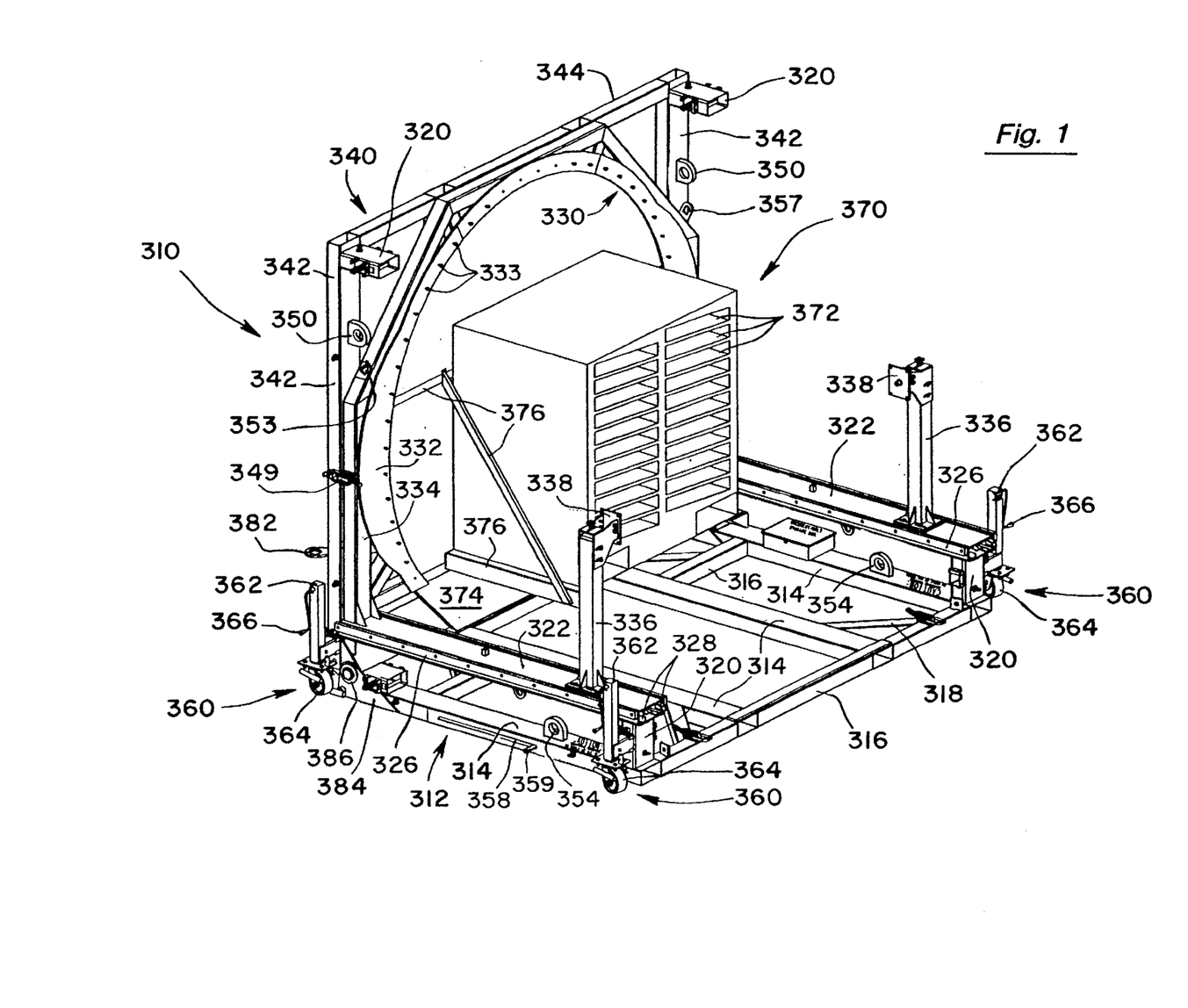
FIG. 1 is a perspective view of the fan shipping frame of this invention.
Figure 2:
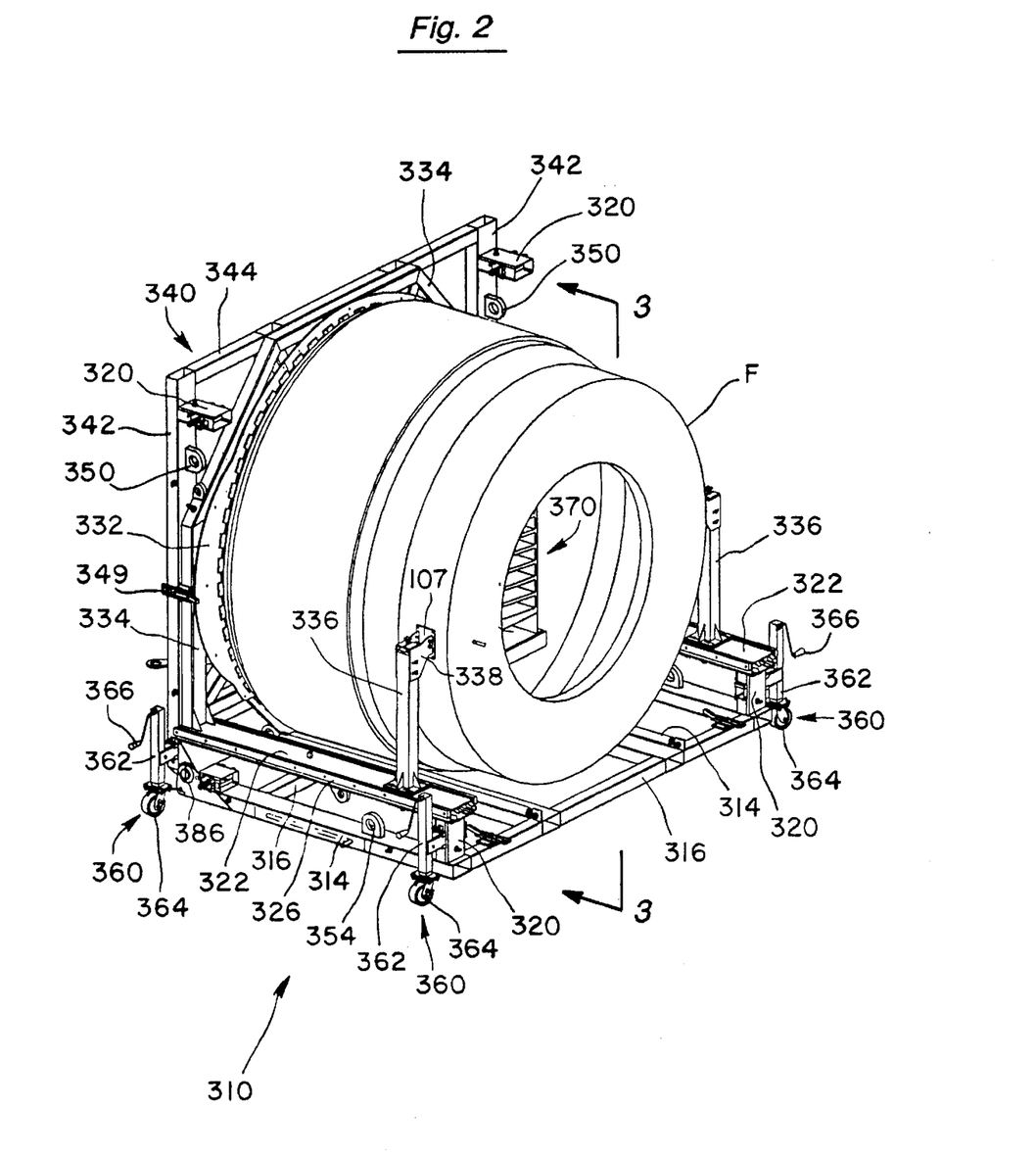
FIG. 2 is a perspective view of the fan shipping frame of this invention with a fan section mounted thereon.

According to the fan shipping frame 310 of this invention, as best seen in FIG. 1, it includes a frame assembly 312 having a plurality of longitudinal members 314 interconnected by a plurality of transverse members 316. Additionally, to provide greater frame support, diagonal members 318 are interspersed along the frame assembly and attached to members 314 and 316. The frame assembly may be assembled by welding the members together or, alternatively, an appropriate bolt and nut combination may be utilized.

Mounted on each corner of the frame assembly 312 is a pylon 320. As best seen in FIG. 1, pylons 320 serve to connect rail members 322 to the frame assembly 312. As shown, a pair of rail members 322 are mounted in parallel relationship on the frame assembly 312. Rail members 322 connect with rail members 20 of fan dolly 10. Fan dolly 10 is an apparatus which releasably secures the fan section F of a jet aircraft engine and which enables the fan section F to be loaded directly onto the shipping frame 310 of this invention without the use of external equipment such as complex pulley or winch systems. The fan dolly 10 described and illustrated herein is constructed by Stanley Aviation Corporation of Aurora, Colo. The fan dolly 10 includes a plurality of caster assemblies 40 which enable the fan dolly to be rolled up adjacent the shipping frame 310. The fan section F is secured to the fan dolly 10 by means of a pair of fan support assemblies 60. Attached at the lower end of each support assembly 60 is a corresponding train assembly 120. Train assembly 120 includes a plurality of internal rollers (not shown) which engage with tracks 126 and which enable the fan section F to be traversed across the fan dolly 10. Tracks 126 are mounted on opposing external sides of rail members 20. In the same manner, tracks 326 are mounted on opposing external sides of rail members 322. Thus, when the fan dolly 10 is coupled to the shipping frame 310, the fan section F is initially secured by means of the fan support assemblies 60 and then train assembly 120 is traversed to engage with the aligned tracks 322 of the shipping frame 310, as will be further explained below.

Figure 5:
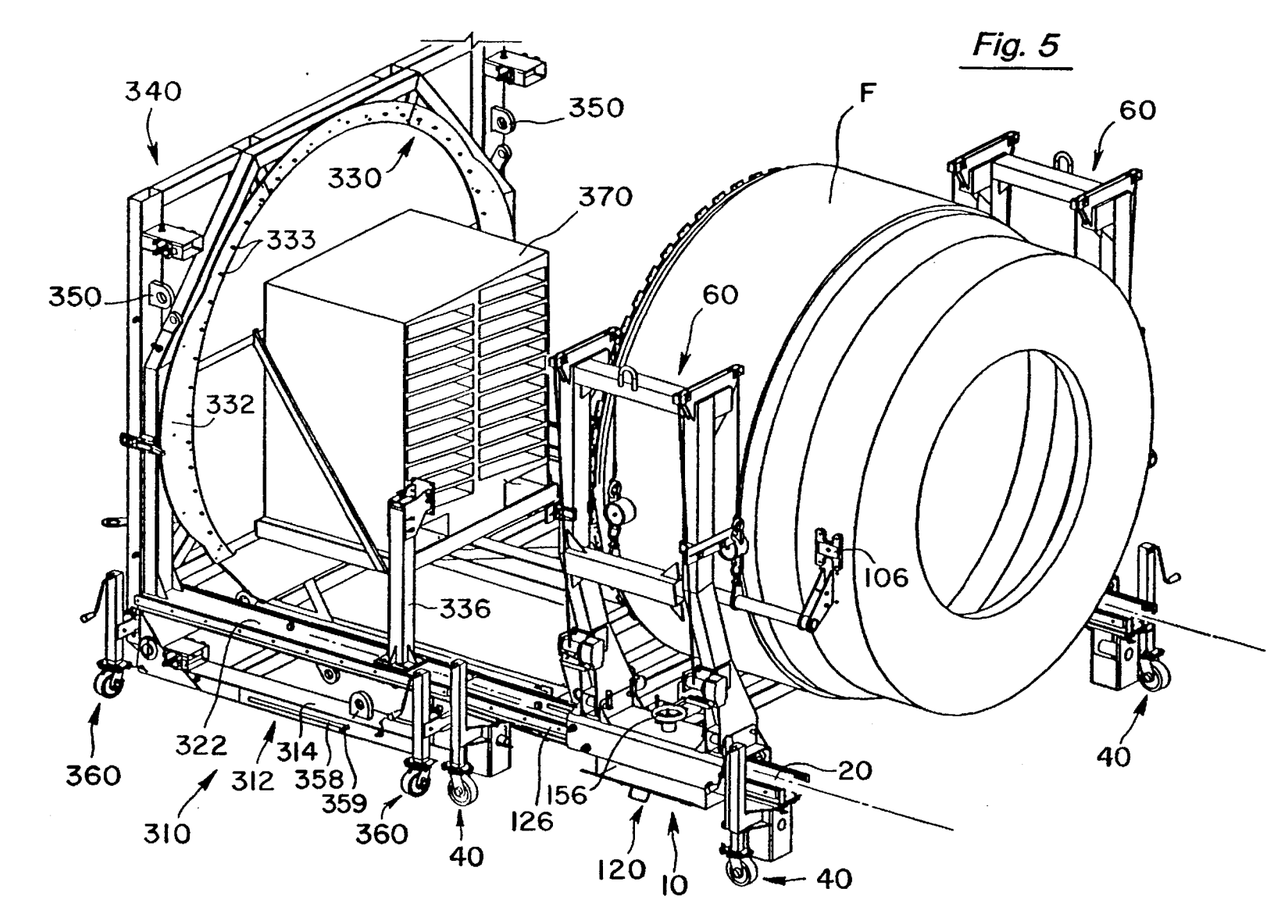
FIG. 5 is a perspective view of the fan dolly of this invention coupled to the fan shipping frame of this invention.
Figures 6, 6A:
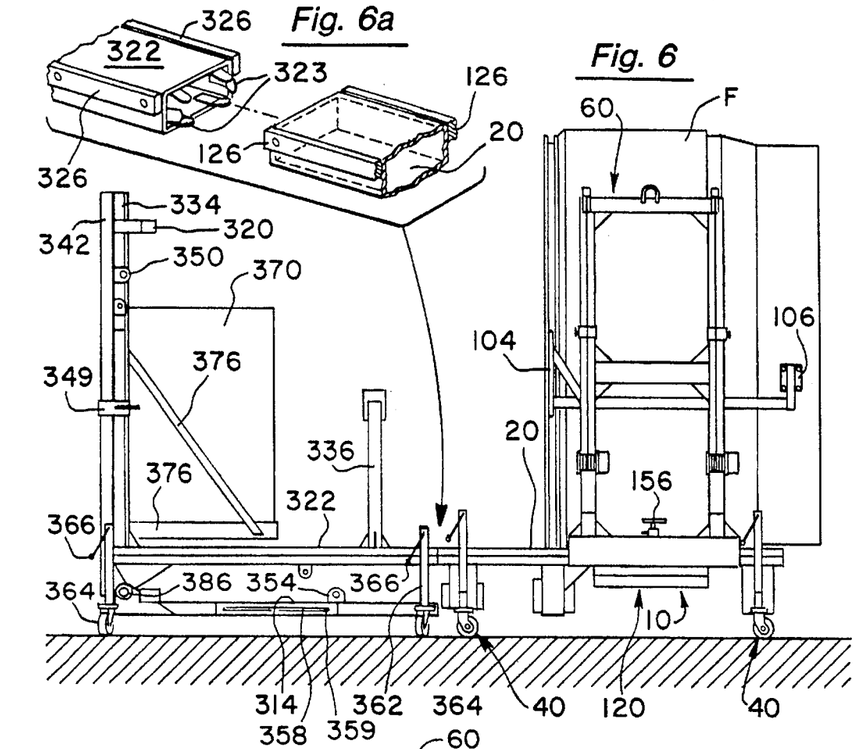
FIG. 6 is a side elevation of the fan dolly of this invention connected to the fan shipping frame of this invention wherein the fan section is mounted on the fan dolly.
FIG. 6a is an enlarged fragmentary exploded perspective view of the connection between the fan dolly and fan shipping frame.

As best seen in FIGS. 5 and 6a, rail members 322 are engageable with the rail members 20 of a fan dolly 10 as by male connecting members 323 which are inserted within the interior space of rail members 20. Rail members 322 include exterior tracks 326 which are disposed on each side of the corresponding rail member and which engage with the interior rollers (not shown) of the train assembly 120. Thus, when the fan section F is loaded on the fan dolly 10 and the fan dolly 10 is coupled to the fan shipping frame 310, train assembly 120 is manipulated, or the fan section may be simply pushed across onto the shipping frame 310 wherein the rolling engagement of the interior rollers with tracks 326 enables the direct transfer of the fan section F onto the shipping frame 310.

In addition to the pylons 320 which attach rail members 322 to the frame assembly 312, there is also a pair of pylons 320 which are positioned on the platform assembly 340. As will be discussed below, the pylons 320 on platform assembly 340 enable caster assemblies 360 to be attached thereto in order to provide locomotive and lift capability to the fan shipping frame when the fan shipping frame is tilted to the horizontal position.

Figure 3:
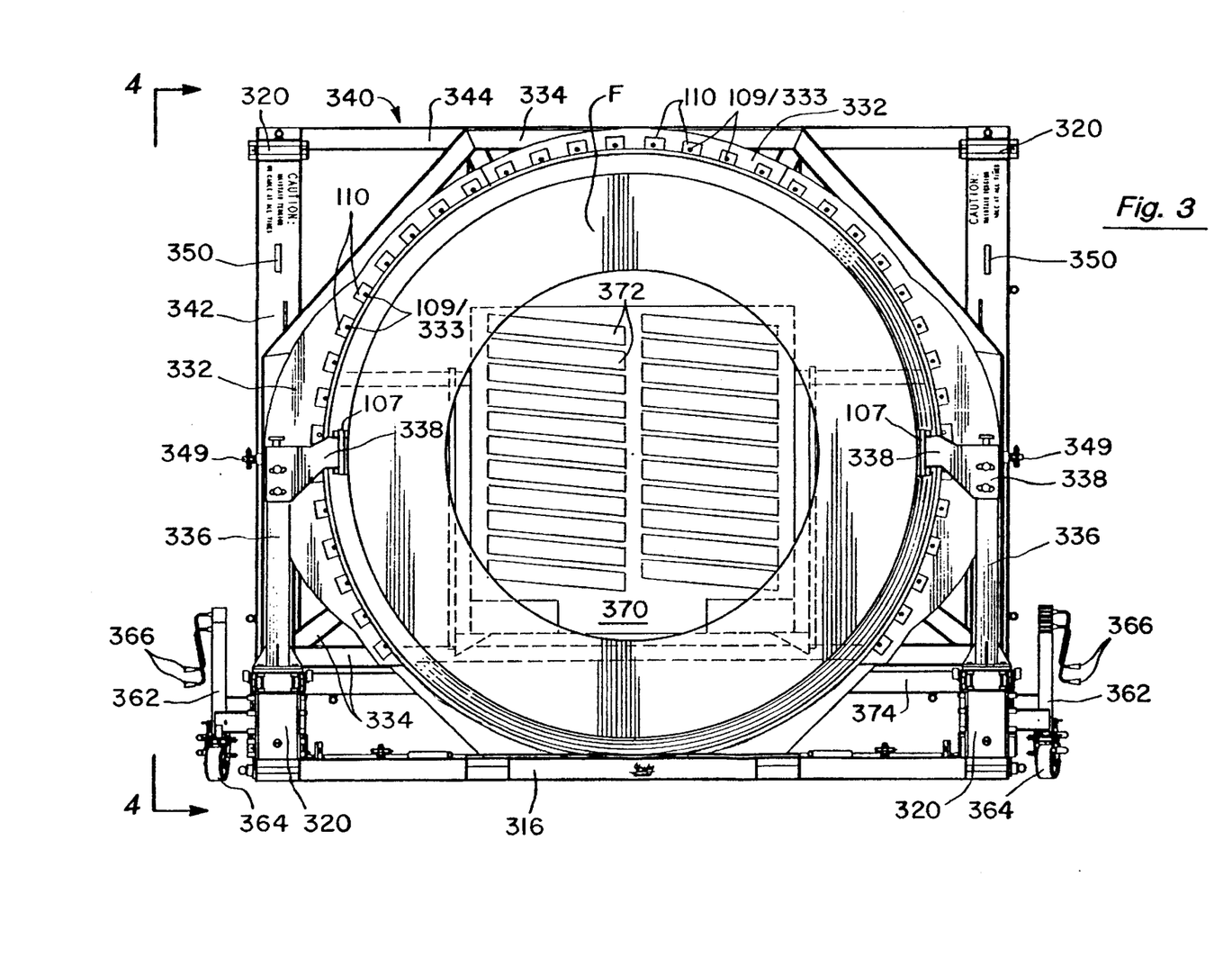
FIG. 3 is a rear elevation of the fan shipping frame of this invention with a fan section mounted thereon.

As seen in FIGS. 1 and 3, when the fan section F is loaded on the shipping frame 310, the fan section F is secured to fan support assembly 330 by means of a plurality of bolts (not shown) which extend through template 332 of fan support assembly 330; template 332 having a plurality of bolt holes 333 which align with bolt holes 109 of attaching ring 110. The template 332 is secured to the platform assembly 340 by means of a plurality of template bracket bars 334. In addition to template 332, a pair of stanchion stabilizers 336 are provided to secure the free end fan section F to the fan shipping frame 310. Stanchion stabilizers 336 attach to rail members 322. The upper end of stanchion stabilizers 336 include stanchion attachment brackets 338 which engage with the ground handling pads 107 of fan section F.

In order that the shipping frame 310 may be tilted to a horizontal position for transport on aircraft such as a C130, platform assembly 340 is provided which connects with frame assembly 312 by means of hinge mechanism 386. Platform assembly 340 includes a pair of longitudinal bars 342 interconnected by cross bar 344. As will be discussed below in reference to FIGS. 10 through 13, hinge mechanism 386 enables platform assembly 340 to rotate so that platform assembly 340 lies opposite to and in line with frame assembly 312. When the fan shipping frame is configured in the upright or vertical position, platform assembly 340 is secured to template bracket bars 334 by means of a pair of platform locks 349.

Mounted to pylons 320 are caster assemblies 360. Each caster assembly 360 includes a jack mechanism 362 with corresponding hand crank 366 which enables the fan shipping frame 310 to be adjusted to the desired height by engaging hand cranks 366. Integral with jack mechanisms 362 are wheels or casters 364 which provide the necessary locomotive capability to the fan shipping frame. Caster assemblies 360 may be mounted on either the frame assembly 312 or the platform assembly 340, depending upon how the fan section is configured for transport.

Figure 4:
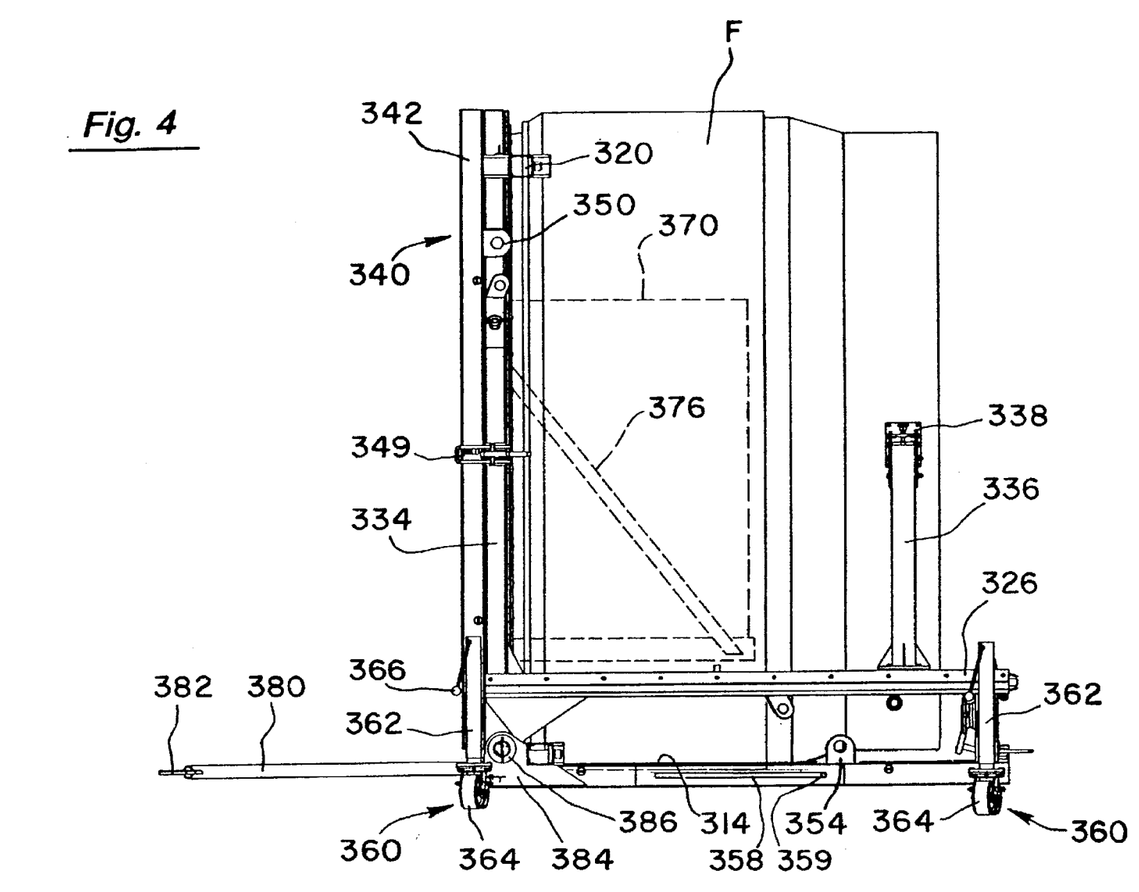
FIG. 4 is a side elevation of the fan shipping frame of this invention with a fan section mounted thereon.

Typically, when the fan section F is transported on the shipping frame 310, the inlet cowl (not shown) is first removed and then, the individual fan blades (not shown) of the fan section are also removed therefrom. Conveniently, fan blade storage container 370 is provided which may mount upon frame assembly 312. Fan blade storage container 370 includes a plurality of storage cells 372, as best seen in FIGS. 1 and 3, which are adapted to receive the fan blades of the fan section F. Thus, regardless whether the fan section F is being transported in the vertical or horizontal position on the fan shipping frame 310, the fan blade storage container 370 provides a means for securing and transporting the fan blades. As best seen in FIG. 1, container 370 is mounted to the shipping frame 310 by means of support brackets 376 which connect to the frame assembly 312 and platform assembly 340. Splash guard 374 is mounted to frame assembly 312 and is provided to protect storage container 370. As illustrated in FIG. 4, if it is necessary to transport the shipping frame 310 over the ground by a vehicle, conveniently, tow extension 380 attaches to frame assembly 312 wherein pintle 382 connects to the ball hitch of the vehicle.

Figure 7:
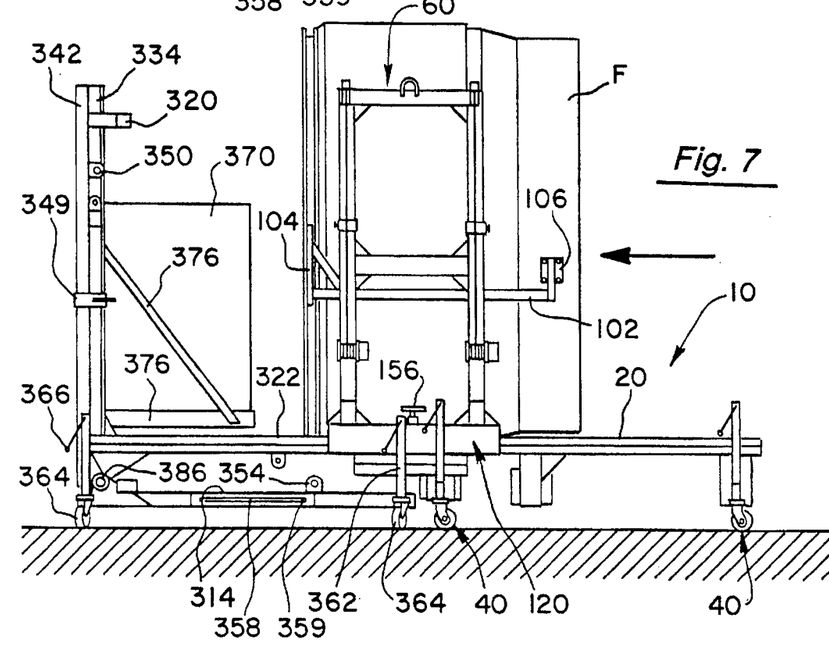
FIG. 7 is a side elevation, as shown in FIG. 6, illustrating the fan section being transferred from the fan dolly to the fan shipping frame.
Figure 8:
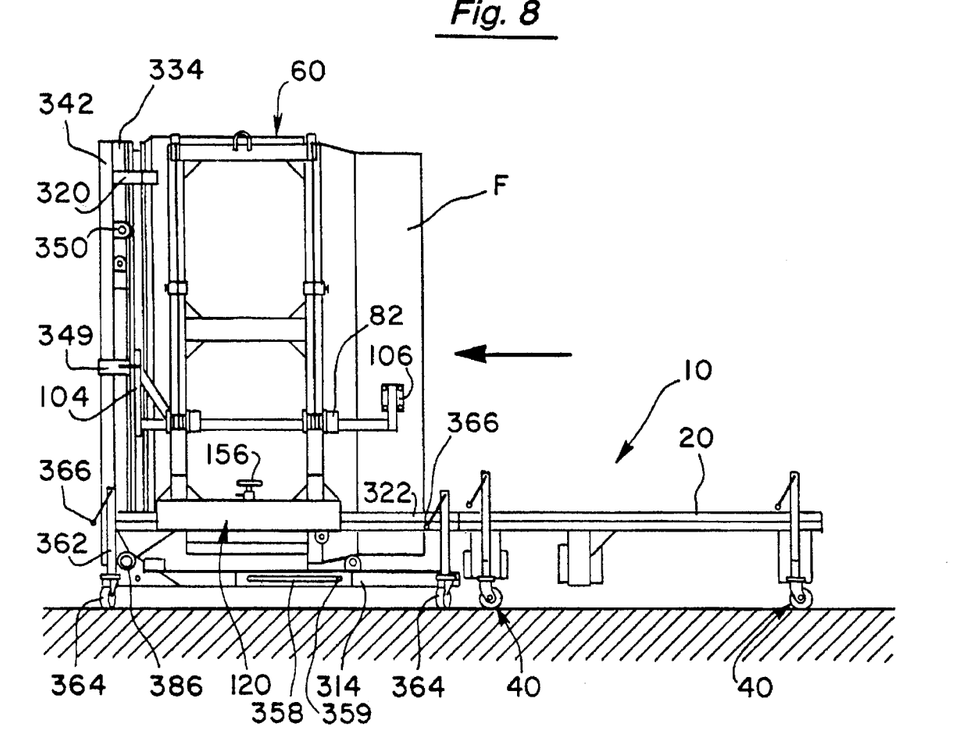
FIG. 8 is a side elevation, as shown in FIGS. 6 and 7, illustrating the fan section after being transferred from the fan dolly to the fan shipping frame.
Figure 9:
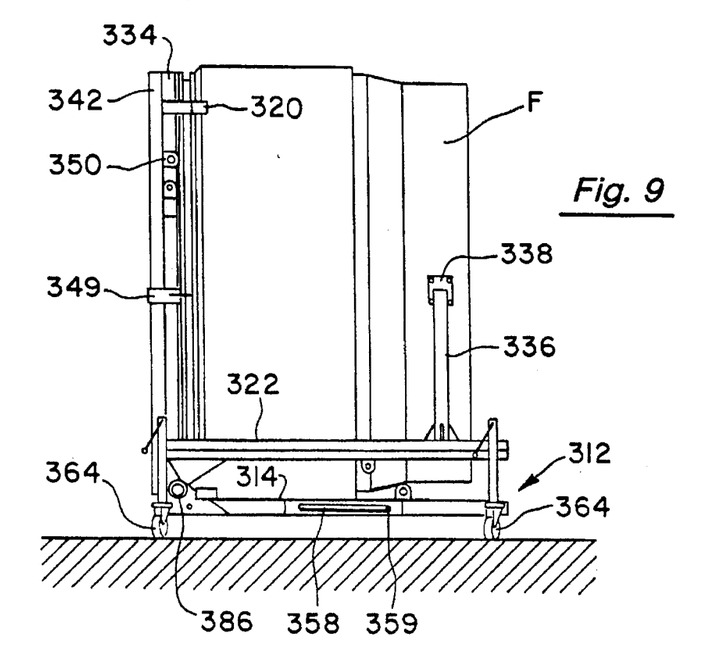
FIG. 9 is a side elevation of the fan shipping frame after the fan dolly has been separated therefrom.

As shown in FIG. 7, fan section F may be transferred onto shipping frame 310 by manipulating traversing wheels 156 of train assemblies 120 or by simply pushing the fan section F to cause the fan section F to displace along rail members 20 and then onto rail members 322. Prior to the transfer of the fan section F onto the shipping frame 310, the stanchion stabilizers 336 must be removed since they are mounted on rail members 322. As shown in FIG. 8, once the fan section F has been completely moved onto the fan shipping frame 310, the fan section F is then in a position for securing it to the shipping frame by aligning the template 332 with attaching ring 110 of the fan section F. Attaching ring 110 includes a plurality of spaced bolt holes 109. The holes 333 of template 332 are aligned with holes 109 and then a plurality of bolts or securing pins (not shown) are passed through the aligned holes 109 and 333. Once the attaching ring 110 is secured to the shipping frame 310, as best seen in FIG. 9, brackets 104 and 106 may be disengaged from the fan section F, and train assemblies 120 may be displaced back across the shipping frame 310 onto fan dolly 10. Shipping frame 310 may then be separated from the fan dolly 10 resulting in the fan section F being fully supported solely by the shipping frame 310. After the disengagement of brackets 104 and 106, stanchion stabilizers 336 are repositioned on rail members 322 and stanchion attachment brackets 338 are connected to ground handling pads 107.

Figure 10:
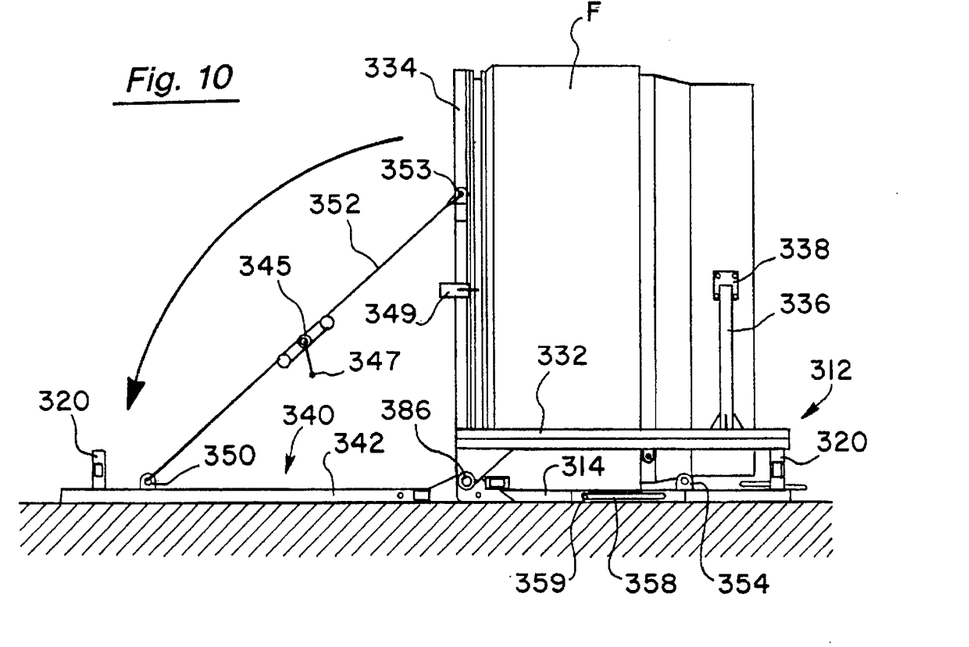
FIG. 10 is a side elevation of the fan shipping frame with fan section mounted thereon illustrating the deployment of the platform assembly.
Figure 11:
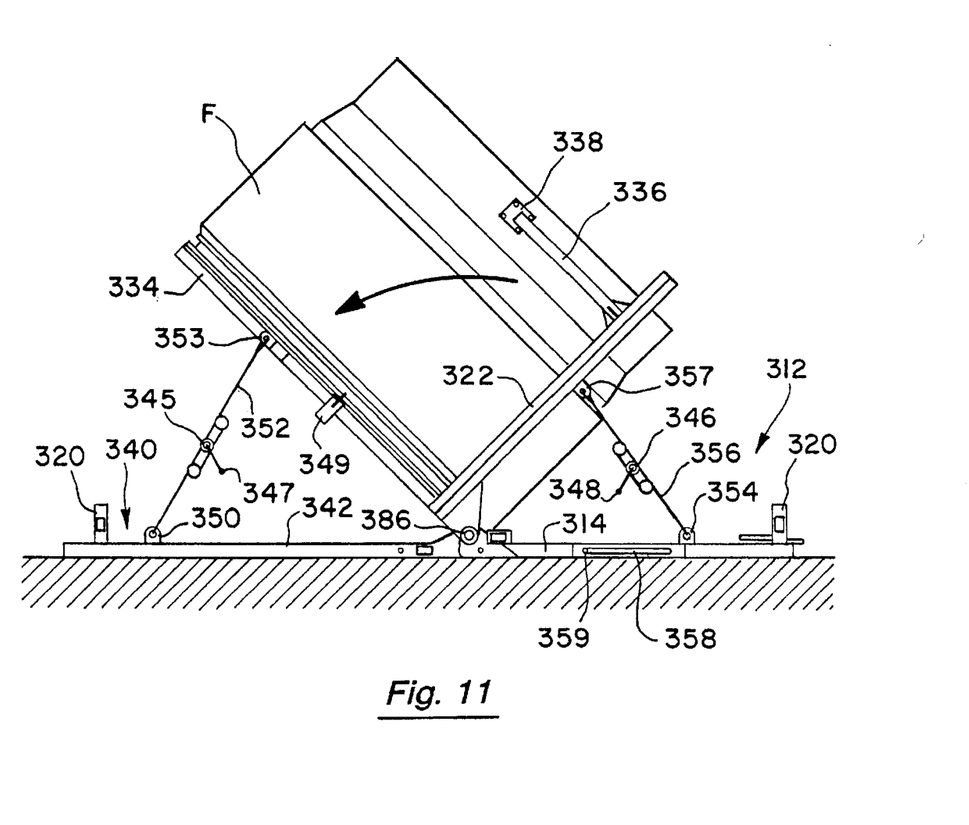
FIG. 11 is a side elevation, as shown in FIG. 10, illustrating a pair of chain hoists being used to stabilize the loaded fan section when tipped from an upright or vertical position to a horizontal or tipped position.
Figure 12:
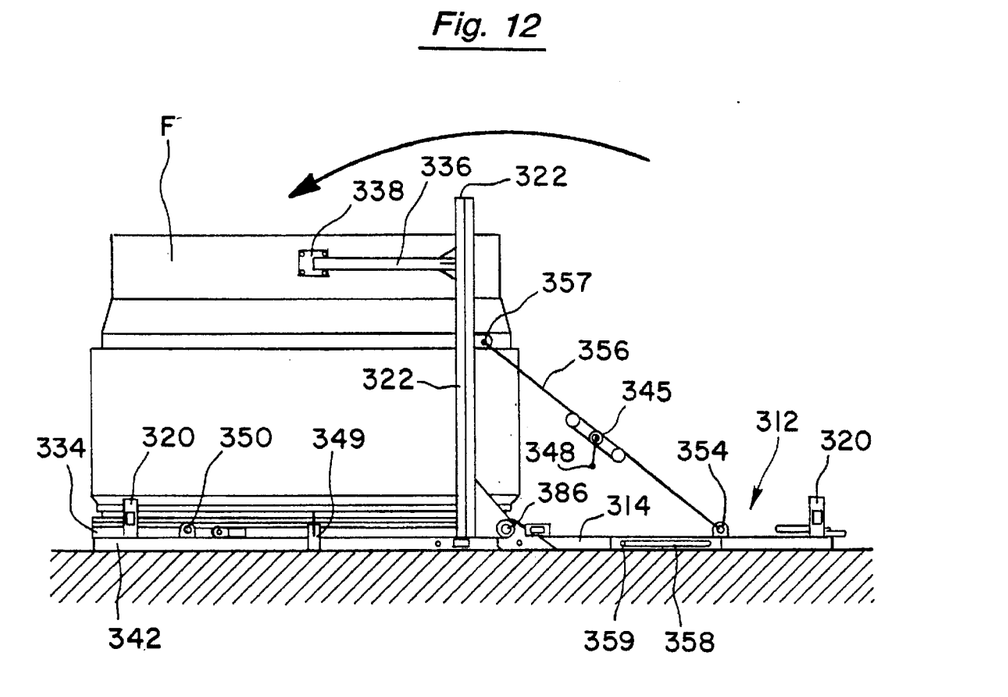
FIG. 12 is a side elevation, as shown in FIGS. 10 and 11, illustrating the fan section loaded on the fan shipping frame that has been completely rotated or tilted to the horizontal position.
Figure 13:
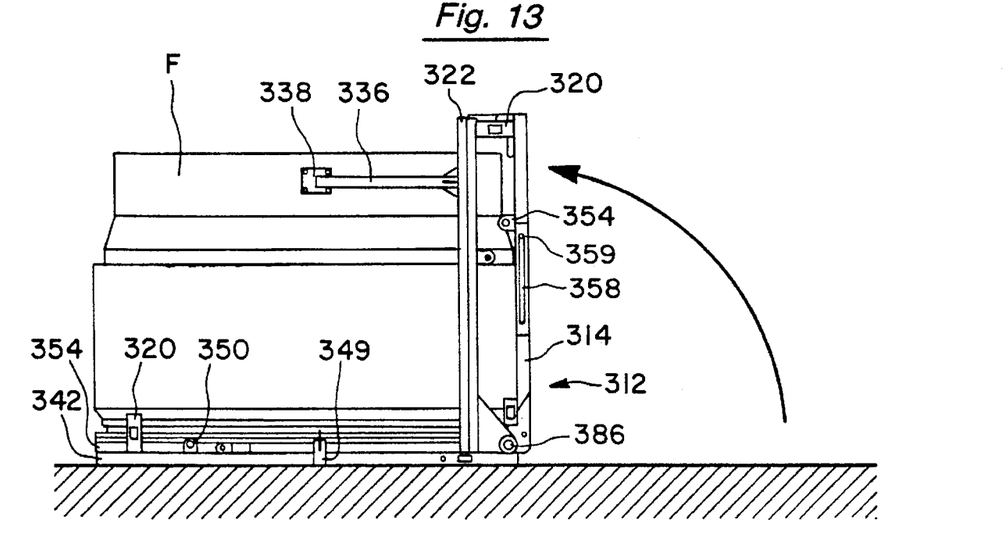
FIG. 13 is a side elevation, as shown in FIGS. 10–12, illustrating the frame assembly of the fan shipping frame reattached to the fan section.

Once stabilizers 336 have been reattached, the shipping frame is prepared for rotation to the horizontal transport position if it is necessary to transpost the fan section F on an aircraft such as a C130. As shown in FIG. 10, the rotating or tipping operation commences with deployment of the platform assembly 340. In accordance therewith, a pair of opposing chain hoists 345 and 346 with corresponding handles 347 and 348 are secured to the shipping frame and platform locks 349 may then be unlocked. Chain hoist 345 is secured between template bracket 334 and longitudinal bar 342 by means of a cable or chain 352 which attaches at opposing ends to platform retaining eye 350 and anchor point 353. The other chain hoist 346 is secured between longitudinal member 314 and rail member 322 by means of cable or chain 356 which attaches at opposing ends to frame retaining eye 354 and anchor point 357. Hand crank 347 of chain hoist 345 is manipulated to lower the platform assembly 340 by means of corresponding chain 352. Hand crank 347 is manipulated until the platform assembly 340 rests on the ground. As shown in FIG. 10, caster assemblies 360 have been removed from the shipping frame 310. In most circumstances, it is desirable to remove the caster assemblies because, during the tipping operation, it is necessary that the shipping frame be in a completely stable and stationary position. As shown in FIG. 11, once platform assembly 340 has been deployed, fan section F may be rotated or tipped to the horizontal transport position. Accordingly, chain hoist 346 is manipulated by hand crank 348 to enable the deployment of chain 356 which, in turn, enables the fan section F to be tipped onto platform 342. Hinge mechanism 386 enables the fan section F to rotate from the vertical position to the horizontal position. However, because of the tremendous load placed on the hinge when the fan section F is halfway between the vertical and horizontal, it may be necessary to provide additional structural support to the hinge. Accordingly, a support bar (not shown) may be placed inside each longitudinal member 314 and slidable into the abutted longitudinal bar 342 when the fan section F is tipped. A longitudinal slot 358 may be formed in each longitudinal member 314 wherein a handle 359 attached to the support bar enables manipulation of the support bar into and out of longitudinal bar 342. Typically, the support bar may be inserted into longitudinal bar 342 so that approximately one-half of the support bar is positionable in both the longitudinal bar 342 and longitudinal member 314. As shown in FIG. 12, the fan section F is tipped completely to the horizontal position. In this configuration, it is now necessary to raise frame assembly 312 to a vertical position. Accordingly, hand crank 348 is again manipulated to draw in chain 356. Once the frame assembly is brought flush up against rail members 322, latch mechanisms (not shown) are activated to securely lock the frame assembly 312 in place.

Once the tipping or rotating operation is complete, caster assemblies 360 may be reattached to the pylons 320 located on platform assembly 340 enabling fan section F to be transported in the horizontal position.

Although the above rotation procedure has been described in rotation of the fan section F from the vertical to the horizontal position, the above procedure can be reversed enabling the fan section F to be rotated from the horizontal to the vertical position. This reversed rotation may be necessary depending upon the type of aircraft(s) used to transport the fan section.

To be able to observe the amount of tension placed on chains 352 and 356, load indicating devices such as dynamometers (not shown) may be placed in-line between the ends of chains 352 and 356 and their corresponding retaining eyes 350 and 354. This load indication ensures that one particular chain hoist is not under or overloaded which in turn ensures that there is a smooth rotation of the fan section F from the vertical to the horizontal or vice versa.

Since FIGS. 10 through 13 are elevational views which only show one side of the apparatus, it will be understood that hoists 345 and 346 are each deployed in pairs, each pair positioned on opposing lateral sides of the shipping frame. Thus, four chain hoists may be used to tip the fan section F. Although chain hoists are illustrated in the preferred embodiment, it will be understood that other types of securing devices may be used such as ratchets or locking pulley systems.

This invention has been described in detail with reference to a particular embodiment thereof, but it will be understood that various other modifications can be effected within the spirit and scope of this invention.

We claim:

1. A shipping frame for transporting a loaded jet aircraft engine fan section including a plurality of fan blades in either a horizontal or vertical position, said shipping frame comprising:

a frame including at least one rail member for supporting the fan section loaded thereon;

a fan support template attached to said frame for releasably securing the fan section thereto;

a train mechanism slidably engageable with said rail member for receiving the fan section and transferring it to said fan support template; and a platform rotatably connected to said frame, said platform being independently and selectively deployable with respect to said support template for positioning the fan section in the horizontal position.

2. A shipping frame, as claimed in claim 1, further including:

at least one caster attached to said frame for providing selective locomotive capability to said shipping frame.

3. A shipping frame, as claimed in claim 1, further including:

a jack mechanism connected to said frame for providing selective height adjustment to said shipping frame.

4. A shipping frame, as claimed in claim 1, wherein:

the fan section includes first and second ends, said shipping frame further including at least one stabilizer connected to the second end of the fan section for providing support thereto and wherein said fan support template is attached to the first end of the fan section.

5. A shipping frame, as claimed in claim 1, further including:

a container mounted on said shipping frame for receiving and storing the fan blades of the fan section.

6. A shipping frame, as claimed in claim 5, wherein:
said container includes a plurality of storage cells, each storage cell configured for receiving and storing one fan blade of the fan section.

7. A shipping frame, as claimed in claim 1, further including:
towing means attached to said frame enabling said shipping frame to be towed by a vehicle.

8. A shipping frame for transporting a loaded jet aircraft engine fan section including a plurality of fan blades in either a horizontal or vertical position, said shipping frame comprising:
frame means for supporting the fan section loaded thereon;
template means attached to said frame means for releasably securing the fan section thereto; and
platform means rotatably connected to said frame means, said platform means being independently and selectively deployable with respect to said template means for selective deployment of the fan section to the horizontal position.

9. A shipping frame, as claimed in claim 8, further including:
a rail member attached to said frame means; and
a train mechanism slidably engageable with said rail member for receiving the fan section and transferring it to said template means.

10. A shipping frame, as claimed in claim 8, further including:
caster means connected to said frame for providing locomotive capability to said shipping frame.

11. A shipping frame, as claimed in claim 8, further including:
means attached to said frame means for selectively raising or lowering said frame means.

12. A shipping frame, as claimed in claim 8, further including:
means mounted on said frame means for the storing fan blades of the fan section.

13. A shipping frame for transporting a loaded jet aircraft engine fan section including a plurality of fan blades in either a horizontal or vertical position, said shipping frame comprising:
a frame for supporting the fan section loaded thereon;
a fan support template attached to said frame for releasably securing the fan section mounted thereto;
a platform rotatably connected to said frame, said platform being independently and selectively deployable with respect to said support template for positioning the fan section in the horizontal position; and
means operatively connected to said platform and said frame for controllably deploying said platform.

14. A shipping frame, as claimed in claim 13, further including:
a rail member mounted on said frame; and
a train mechanism slidably engageable with said rail member for receiving the fan section and transferring it to said fan support template.

15. A shipping frame, as claimed in claim 13, further including:
a container mounted on said frame for receiving and storing the fan blades of the fan section.

16. A method of preparing the fan section of a jet aircraft engine for transport, said method comprising the steps of:
receiving the fan section mounted on a train mechanism;
transferring the fan section from the train mechanism to a fan support template;
attaching the fan section to the fan support template;
separating the train mechanism from the fan section;
deploying a platform that is rotatably coupled to the fan support template; and
tipping the fan section mounted on the fan support template to a horizontal position.

17. A shipping frame for transporting a jet aircraft engine component such as a fan section loaded thereon, in either a horizontal or vertical position, said shipping frame comprising:
a frame for supporting the component;
at least one rail member for assisting in removably mounting the fan section thereon;
a template member attached to said shipping fame for releasably securing the fan section thereto; and
means connected to said shipping frame for independently and selectively deploying the fan section with respect to said template member to a desired position.

18. A shipping frame, as claimed in claim 17, wherein said template member includes:
a plurality of holes arranged in an arc-like manner and formed on said template member for aligned attachment of the fan section to said shipping frame.

19. A shipping frame, as claimed in claim 17, further including:
at least one caster attached to said shipping frame for providing selective locomotive capability to said shipping frame.

20. A shipping frame, as claimed in claim 17, further including:
at least one jack mechanism connected to said shipping frame for providing selective height adjustment to said shipping frame.

21. A shipping frame, as claimed in claim 17, further including:
at least one stanchion stabilizer connected to said shipping frame.

22. A shipping frame, as claimed in claim 17, further including:
a towing member attached to said shipping frame enabling said shipping frame to be towed by a vehicle.

23. A shipping frame, as claimed in claim 17, further including:
a container mounted on said shipping frame for receiving and storing fan blades of the fan section.

24. A shipping frame, as claimed in claim 23, wherein said container includes:
a plurality of storage cells, each storage cell configured for receiving and storing at least one fan blade of the fan section.

25. A shipping frame for transporting a jet aircraft engine component such as a fan section loaded thereon, in either a horizontal or vertical position, the fan section including a first end and second end, said shipping frame comprising:
a frame for supporting the fan section;
a template attached to said shipping frame for releasably securing the first end of the fan section thereto; and
means connected to said shipping frame for selective and independent deployment of the fan section with respect to said template to a desired position.

26. A shipping frame, as claimed in claim 25, further including:

at least one stanchion stabilizer connected to said shipping frame for releasably securing the second end of the fan section thereto.

27. A shipping frame, as claimed in claim 25, further including:

a container mounted on said shipping frame for receiving and storing fan blades of the fan section.

28. A shipping frame, as claimed in claim 25, further including:

means attached to said shipping frame for releasably securing the second end of the fan section thereto.

29. A shipping frame for transporting a jet aircraft engine component such as a fan section loaded thereon in either a horizontal or vertical position, said shipping frame comprising:

a movable frame for supporting the jet aircraft engine component thereon;

a template attached to said shipping frame for releasably securing one end of the component thereto; and at least one fixed stabilizer connected to said shipping frame for releasably securing another end of the component thereto.

30. A shipping frame, as claimed in claim 29, further including:

means operatively connected to said shipping frame for selective tipping of the component to a horizontal position.

31. A shipping frame, as claimed in claim 29, further including:

a container mounted on said shipping frame for receiving and storing fan blades of the jet aircraft engine fan section.

32. A shipping frame, as claimed in claim 29, wherein said template includes:

a plurality of holes arranged in an arc-like manner and formed on said template member for aligned attachment of the jet aircraft engine fan section to said shipping frame.

33. A shipping frame, as claimed in claim 29, further including:

at least one caster attached to said shipping frame for providing selective locomotive capability to said shipping frame.

34. A shipping frame, as claimed in claim 29, further including:

at least one rail member mounted to said shipping frame for removably mounting the component loaded thereon.

35. A shipping frame, as claimed in claim 29, further including:

a jack mechanism connected to said shipping frame and communicating with said at least one caster for providing selective height adjustment to said shipping frame.

36. A shipping frame for transporting a jet aircraft engine component such as a fan section loaded thereon, said shipping frame comprising:

a frame for supporting the component thereon;

a template attached to said frame for releasably securing an end of the component thereto; and a rotatable platform member pivotally attached to said shipping frame, said platform member being independently and selectively deployable with respect to said template when tipping the component to either a horizontal or vertical position.

37. A shipping frame, as claimed in claim 36, further including:

a securing device operatively coupled to said frame for selectively controlling the tipping of the component to either a horizontal or vertical position.

38. A method of preparing a fan section of a jet aircraft engine for transport, said method comprising the steps of:

mounting the fan section onto a shipping device;

securing the fan section to the shipping device;

selectively tipping the fan section about a fixed axis to a desired position in order to transport the fan section in either a horizontal or vertical manner.

39. A method, as claimed in claim 38, further including the step of:

receiving the fan section prior to said mounting step by means of at least one rail.

40. A method, as claimed in claim 38, wherein said tipping step further includes the step of:

controlling the tipping of the fan section by a securing device.

41. A method, as claimed in claim 38, where said tipping step further includes the steps of:

deploying a platform member;

separating the fan section from a portion of the shipping device to which the fan section is mounted;

controllably tipping the fan section to the desired position; and reattaching the fan section to the portion of the shipping device after the fan section has been tipped to the desired position.

* * * * *

UNITED STATES PATENT AND TRADEMARK OFFICE
CERTIFICATE OF CORRECTION

PATENT NO. : 5,645,389

DATED : July 8, 1997

INVENTOR(S) : Gerald D. Lilja, et al.

It is certified that error appears in the above-identified patent and that said Letters Patent is hereby corrected as shown below:

On title page, item [54], title of invention and
    Column 1, line 1, delete "FROM" and insert --FOR--.

Signed and Sealed this

Third Day of November, 1998

Attest:

BRUCE LEHMAN

Attesting Officer      Commissioner of Patents and Trademarks